United States Patent
Paping

[11] Patent Number: 5,329,974
[45] Date of Patent: Jul. 19, 1994

[54] PROCESS OF COLLECTING AND PROCESSING NON-AQUEOUS DRIP-LIQUIDS

[75] Inventor: Max G. Paping, Culemborg, Netherlands

[73] Assignee: Holding M.G. Paping B.V., Netherlands

[21] Appl. No.: 50,115

[22] PCT Filed: Aug. 29, 1991

[86] PCT No.: PCT/EP91/01653

§ 371 Date: Apr. 29, 1993

§ 102(e) Date: Apr. 29, 1993

[87] PCT Pub. No.: WO92/04576

PCT Pub. Date: Mar. 19, 1992

[30] Foreign Application Priority Data

Aug. 30, 1990 [NL] Netherlands .................. 9001921

[51] Int. Cl.⁵ .................................... B65B 1/20
[52] U.S. Cl. .................. 141/11; 141/311 A; 141/86; 220/573; 184/1.5; 210/671
[58] Field of Search ........... 141/1, 11, 98, 311 A, 141/86, 88; 220/573; 184/1.5, 106; 134/6, 10, 40; 210/671

[56] References Cited

U.S. PATENT DOCUMENTS

| | | | |
|---|---|---|---|
| 2,198,164 | 4/1940 | Hall | 15/210 |
| 3,141,522 | 7/1964 | Fitzpatrick | 184/106 |
| 3,195,683 | 7/1965 | Peterson | 184/106 |
| 3,282,381 | 11/1966 | Fitzpatrick | 184/106 |
| 3,722,626 | 3/1973 | Stack | 184/106 |
| 4,114,717 | 9/1978 | Andrews | 180/69.1 |
| 4,136,217 | 1/1979 | Henley | 134/10 |
| 4,675,226 | 6/1987 | Ott | 428/102 |
| 4,801,005 | 1/1989 | Hahn et al. | 141/86 |
| 4,909,355 | 3/1990 | Ramos | 184/106 |
| 4,923,052 | 5/1990 | Englebert | 184/106 |
| 5,229,006 | 7/1993 | Brinkley | 210/671 |

FOREIGN PATENT DOCUMENTS

| | | |
|---|---|---|
| 0097036 | 12/1983 | European Pat. Off. |
| 1957070 | 5/1971 | Fed. Rep. of Germany |
| 2405691 | 5/1979 | France |

*Primary Examiner*—Henry J. Recla
*Assistant Examiner*—Steven O. Douglas
*Attorney, Agent, or Firm*—Ostrolenk, Faber, Gerb & Soffen

[57] ABSTRACT

A process for catching and processing non-aqueous drip-liquids, characterized in that the drip-liquid to be processed is caught in an oily and non-aqueous liquids absorbing, water-repelling, liquid catching on a non-woven cloth, incorporated into an envelope of a hydrophobic synthetic resin fiber fabric, which envelope with cloth is partitioned in a suitable manner in a number of tracks of fields; the enveloped liquid catching cloth with absorbed drip-liquid are collected, the collected envelope liquid catching cloths are washed in a solvent for the drip-liquid, the drip-liquid is separated from the solvent, the drip-liquid so recovered is incinerated with power-generation and the cleaned enveloped liquid catching cloths may be used anew.

6 Claims, 1 Drawing Sheet

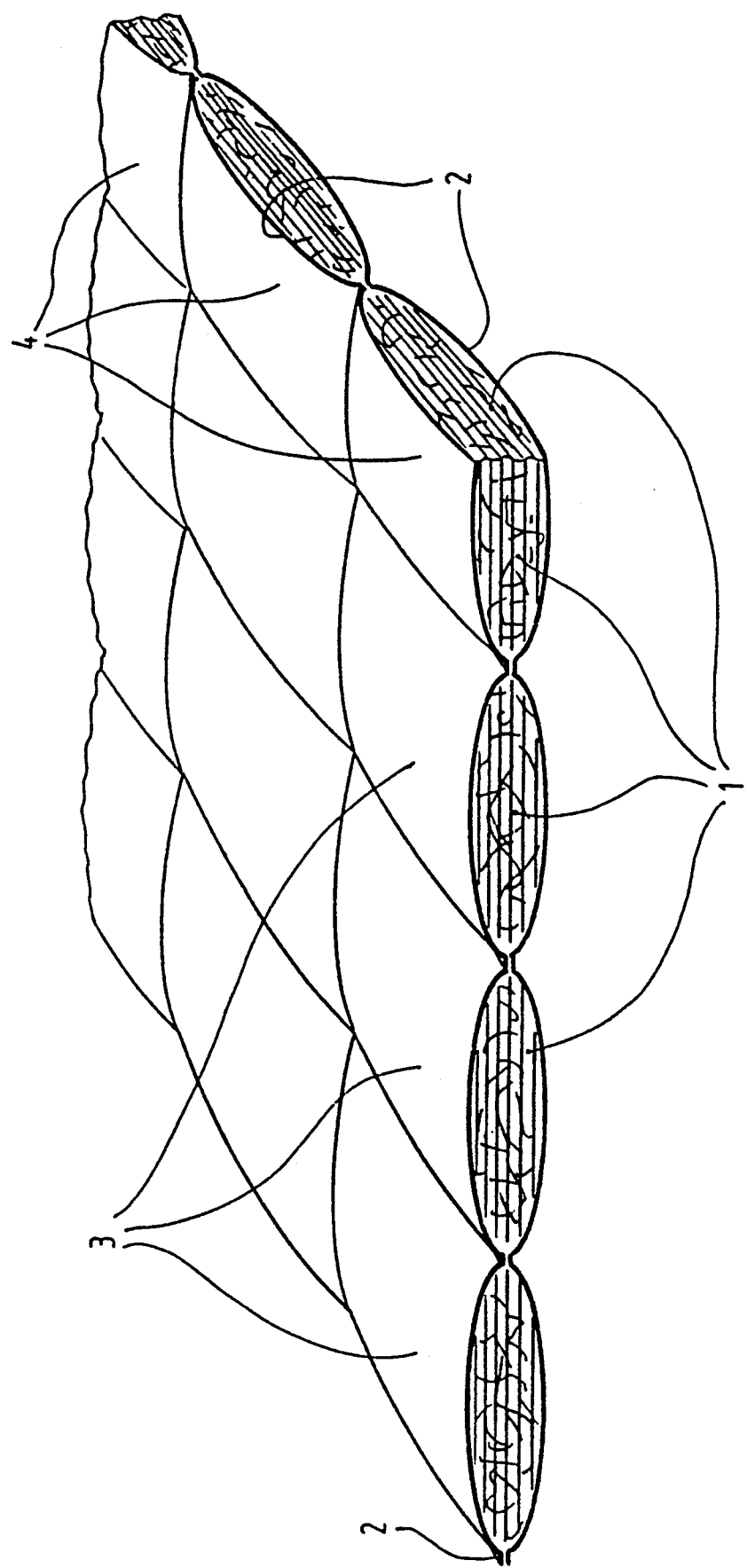

PROCESS OF COLLECTING AND PROCESSING NON-AQUEOUS DRIP-LIQUIDS

The invention relates to a process for catching and processing of non-aqueous drip-liquids, and to a liquid catching cloth for use therein.

In everyday household and industry practice, drip-liquids of oily nature are frequently caught. This catching takes place with granules or a liquid catching cloth, which in its simplest form comprises absorbent paper or a loosely-woven or non-woven textile material. Once the catching material is somewhat soaked, it is removed and discarded. At the place of the leak, granules are sprinkled or a new catching cloth is laid.

The waste disposal of the caught materials with substantial amounts of absorption constitute a problem, namely the processing of large amounts of accompanying materials and the process of many different kinds of caught materials, among which may be materials present which cause environmental pollutive effects. The catching of drip-liquids occurs very frequently in the industry. There may be mentioned the automotive industry, garages, the printing trade, and metallurgical industry, ship engines, the food processing industry and certainly not in the last place the oil and chemical industry, whereby all kinds of non-aqueous and also aqueous liquids may pollute the working floor and should be taken up. It is noted also that aqueous liquids can do so and that they interfere in the absorption of other water immiscible liquids since aqueous liquids are caught in many absorbents.

Liquid catching cloths are also known, which lack this disadvantage and which are water-repellent, that is that they do not show or hardly show an affinity for water and aqueous liquids, but they do show a high absorptive power for oils and hydrophobic chemicals. From these compounds they can catch a lot (up to 25 times their own weight) and they do so fast too. They are products on a non-woven synthetic resin basis, mostly polypropylene micro fibers fleeces.

So far these liquid catching cloths were used predominantly for the removal of oil and chemicals from surface waters. For catching and removing of drip-liquids, the product has not found acceptance. The initial expenses are too high therefor.

It has now been found that this aspect, as well as the presence for the used cloths in the waste stream and thereby the complication of the processing of that waste stream, can be prevented.

U.S. Pat. No. 2,198,164 discloses a process for cathing non-aqueous drip-liquids in a liquid catching cloth where the drip-liquids are caught in an oily and non-aqueous liquid absorbing liquid catching non-woven cloth, incorporated in an envelope of a fabric which envelope with cloth is partitioned in a suitable manner of tracks or fields. After usage of such cloth it has to be disposed of, which pollutes the environment.

The present invention provides a process for catching in a liquid catching cloth and processing non-aqueous drip-liquids, in which the drip-liquids to be processed are caught in an oily and non-aqueous liquid cathing non-woven cloth, incorporated into an envelope of a fabric, which envelope with cloth is partitioned in a suitable manner in a number of tracks or fields, characterized in that the liquid cathing cloth is water-repelling; the envelope is of a hydrophobic synthetic resin fiber; the enveloped liquid cathing cloth with absorbed drip-liquids is collected; the collected enveloped liquid cathing cloths are washed in a solvent for the drip-liquid; the drip-liquid is separated from the solvent; the drip-liquid recovered is incinerated with power-generation and the cleaned enveloped liquid catching cloths may be used anew.

Further the present invention provides a cloth on a non-woven basis for use in the process suited for catching oily and non-aqueous drip-liquids and incorporated into an envelope of a fabric, which envelope with cloth is partitioned in a suitable manner in a number of tracks or fields, characterized in that said cloth is water-repelling and said envelope is of a hydrophobic synthetic resin fiber.

It is noted that the liquid catching non-woven cloth as such is useless for the process because it cannot be washed several times and then used again.

The hydrophobic synthetic resin is preferably polypropylene. The polypropylene fiber fabric is preferably partitioned in tracks by stitching through the combination of envelope and liquid catching cloth with a synthetic resin yarn. In this way, the combination of envelope and liquid catching cloth can be used several times. Thus the initial cost of the enveloped product can be spread over a broad time period, which reduces the cost per time to a fraction of the cost for a disposable liquid catching cloth. The present invention relates to

SUMMARY OF THE INVENTION

It is an object of the present invention to provide a

Other features and advantages of the present invention will become apparent from the following description of the invention which refers to the accompanying drawings.

BRIEF DESCRIPTION OF THE DRAWING

The invention is further elucidated by the sole FIGURE which represents a perspective view of a combination of envelope and liquid catching cloth for use in this invention.

Herein the reference number 1 refers to the liquid catching cloth with polypropylene micro fiber fleece. The threads of this fiber fleece are drawn under magnification for clarity's sake. The envelope 2 has tracks in longitudinal direction 3 and tracks in traverse direction 4. In this way, a field is created.

The invention will now be further elucidated by the following example.

EXAMPLE

Starting from a web of polypropylene micro fiber fleece and a web of an enveloping polypropylene fiber fabric 1/1 of fibers dtex 1100, a mat was manufactured which was 100 cm wide, divided into pieces of 70 cm long and stitched through in some places with polyester no. 100 continuous sewing thread, so that the cloth is divided into tracks.

The mat is delivered to an industry which wants to catch leaking oil. After 2, 4 or 6 weeks, depending on the pollution rate, the cloths with absorbed oil are collected and the polluted mats are washed. The washing liquid is separated from the oil and returned to the washing machine. The recovery oil is incinerated in an oven with energy recovery. The cleaned mats are used anew. After 15 repeated uses, the mats were incinerated with the oil. The ashes which remain are very slight (0.05% of ashes).

A promising field of use for a liquid catching cloth according to the present invention is road construction. For such use, the cloth is preferably provided with at least one sheet of water tight material, such as a so called combined HDPE/LDPE (High & Low Density Polyethylene) geomembrane, preferably with a double sided coating. Such material is strong and flexible and is marked by Nicolon under the trade mark Nicotarp ®. It can also be provided with non woven material.

By including such sheet of Nicotarp ®, liquid is prevented from dripping into the soil below.

I claim:

1. A process for catching and processing non-aqueous drip-liquids, in which the drip-liquids to be processed are caught in an oily and non-aqueous liquid catching, non-woven, water repelling cloth which is incorporated into an envelope of a hydrophobic synthetic resin fiber fabric, the envelope with cloth being partitioned in a number of tracks, collecting the enveloped liquid catching cloth with absorbed drip-liquids, washing the collected envelope liquid catching cloth in a solvent for the drip liquid, separating the drip liquid from the solvent, and incinerating the separated drip liquids with power generation.

2. The process of claim 1 in which the process is repeated at least once using the enveloped liquid catching cloth after it has been washed with the solvent.

3. A cloth for use in the process according to claim 1, comprising an oily and non-aqueous liquid catching, non-woven, water repelling cloth enveloped by a hydrophobic synthetic resin fiber fabric, the envelope with cloth being partitioned in a number of tracks.

4. Cloth according to claim 3 in which the hydrophobic synthetic resin is polypropylene.

5. Cloth according to claim 4 in which the envelope with cloth is partitioned by a synthetic resin yarn stitched through the combination of envelope and liquid catching cloth.

6. Cloth according to claim 5 wherein the fiber fabric is 1/1 fabric of fibers dtext 1100 and the synthetic resin yarn is 100% polyester #100 continuous sewing thread.

* * * * *